(12) United States Patent
Paulus et al.

(10) Patent No.: US 10,244,161 B2
(45) Date of Patent: Mar. 26, 2019

(54) CAPTURING AND VIEWING PRIVATE PHOTOS AND VIDEOS

(71) Applicant: Microsoft Technology Licensing, LLC, Redmond, WA (US)

(72) Inventors: Owen W. Paulus, Kirkland, WA (US); Malini Jagannadhan, Seattle, WA (US); Will Dixon, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/406,460

(22) Filed: Jan. 13, 2017

(65) Prior Publication Data
US 2018/0205876 A1    Jul. 19, 2018

(51) Int. Cl.
*H04L 9/32*    (2006.01)
*H04N 5/77*    (2006.01)
*H04N 9/82*    (2006.01)
*H04N 5/232*   (2006.01)

(52) U.S. Cl.
CPC ....... *H04N 5/23216* (2013.01); *H04L 9/3247* (2013.01); *H04N 5/23293* (2013.01); *H04N 5/772* (2013.01); *H04N 9/8205* (2013.01)

(58) Field of Classification Search
CPC .......... H04N 5/23216; H04N 5/23293; H04N 5/907; H04N 5/772; H04N 5/765; H04N 5/9201; H04N 19/625; H04N 19/13; H04L 9/3247; G06F 21/62; G06F 21/60; G06F 21/31; G06F 21/6281; G06F 2221/2141

USPC ....................................... 348/231.99
See application file for complete search history.

(56) References Cited

U.S. PATENT DOCUMENTS

| | | | |
|---|---|---|---|
| 8,157,396 B2 * | 4/2012 | Smith, Jr. | G03B 15/02 362/3 |
| 8,482,633 B2 | 7/2013 | Lee | |
| 9,076,008 B1 | 7/2015 | Moy | |
| 9,122,645 B1 * | 9/2015 | Amidon | G06Q 50/01 |

(Continued)

OTHER PUBLICATIONS

Barrett, Brian, "We Need a 'Private Photo' Mode for Phones", Sep. 2, 2014 Available at: http://gizmodo.com/a-private-photo-mode-for-your-phone-is-a-great-idea-1629860658.

(Continued)

*Primary Examiner* — Pritham D Prabhakher
(74) *Attorney, Agent, or Firm* — Alleman Hall Creasman & Tuttle LLP

(57) ABSTRACT

In one example, a camera includes an imaging sensor to translate light into a digital image, a storage device to save the digital image in a digital format, and a privacy module. The privacy module is configured to set a privacy setting of the newly-captured digital image to indicate that the newly-captured digital image is a private digital image based at least on the privacy module being set to a privacy mode and to set the privacy setting to indicate that the newly-captured digital image is a non-private digital image based at least on the privacy module not being set to the privacy mode. The newly-captured digital image is saved in the digital format regardless if the newly-captured digital image is a private digital image or a non-private digital image. The camera includes an image display interface to display, without authenticating private image credentials, only non-private digital images.

20 Claims, 7 Drawing Sheets

(56) References Cited

U.S. PATENT DOCUMENTS

| | | | |
|---|---|---|---|
| 9,140,444 B2* | 9/2015 | Connor | F21V 33/0076 |
| 9,171,181 B2* | 10/2015 | Balusu | H04W 4/21 |
| 9,532,008 B2* | 12/2016 | Ohnishi | G03B 21/26 |
| 9,628,702 B2* | 4/2017 | Petrescu | H04N 5/23222 |
| 9,672,332 B2* | 6/2017 | Nurmi | G06F 21/10 |
| 9,774,779 B2* | 9/2017 | Petrescu | H04N 5/23222 |
| 9,888,049 B2* | 2/2018 | Niida | H04N 21/234345 |
| 9,940,525 B2* | 4/2018 | Wolf | G06K 9/00771 |
| 9,986,152 B2* | 5/2018 | Saraya | H04N 5/23219 |
| 2004/0201751 A1* | 10/2004 | Bell | H04N 5/772 348/231.99 |
| 2005/0068437 A1* | 3/2005 | Hayasaka | G08B 13/19682 348/294 |
| 2006/0047966 A1* | 3/2006 | Iwamura | H04N 1/32128 713/176 |
| 2006/0248348 A1* | 11/2006 | Wakao | H04N 1/32101 713/186 |
| 2009/0322904 A1* | 12/2009 | Takahashi | G11B 27/034 348/231.3 |
| 2010/0149330 A1* | 6/2010 | Salgar | G08B 13/19686 348/143 |
| 2011/0202968 A1* | 8/2011 | Nurmi | G06F 21/10 726/1 |
| 2012/0007866 A1* | 1/2012 | Tahan | G06F 19/321 345/428 |
| 2012/0009896 A1* | 1/2012 | Bandyopadhyay | G06F 1/1643 455/411 |
| 2012/0059910 A1* | 3/2012 | Cassidy | G06F 17/30029 709/219 |
| 2012/0081575 A1* | 4/2012 | Takahashi | G11B 27/034 348/231.3 |
| 2013/0194438 A1* | 8/2013 | Sweet, III | G06K 9/00221 348/207.1 |
| 2013/0283401 A1* | 10/2013 | Pabla | G06F 21/60 726/30 |
| 2013/0305354 A1* | 11/2013 | King | G06F 21/31 726/19 |
| 2013/0308000 A1* | 11/2013 | Kitajima | G06F 3/005 348/207.1 |
| 2014/0285687 A1* | 9/2014 | Yamamoto | H04N 1/2133 348/231.99 |
| 2014/0298478 A1* | 10/2014 | Kim | G06F 3/0488 726/26 |
| 2015/0101022 A1* | 4/2015 | Zent | H04L 63/104 726/4 |
| 2015/0113661 A1* | 4/2015 | Mishra | G06F 21/6245 726/26 |
| 2015/0186660 A1* | 7/2015 | Sherrets | G06F 21/604 726/30 |
| 2015/0245199 A1* | 8/2015 | Blitzstein | H04W 12/02 455/411 |
| 2016/0034704 A1* | 2/2016 | Shim | H04N 1/4486 726/26 |
| 2016/0134635 A1* | 5/2016 | Thelin | H04L 67/32 726/28 |
| 2017/0300757 A1* | 10/2017 | Wolf | G06K 9/00771 |
| 2017/0324784 A1* | 11/2017 | Taine | H04L 65/1069 |
| 2018/0025215 A1* | 1/2018 | Yousef | G06F 17/30247 382/118 |
| 2018/0041504 A1* | 2/2018 | Balasubramanian | H04L 63/102 |
| 2018/0041693 A1* | 2/2018 | Saraya | H04N 5/23219 |

OTHER PUBLICATIONS

Chaithanya, Rapur Krishna, "How to Hide Any Files Without Installing ThirdParty Apps on Android | Lollipop", Published on: Mar. 2015 Available at: http://getgoogles.blogspot.in/2015/03/how-to-hide-any-files-without-any.html.

Hoffman, Chris, "5 Things You Need to Know about Your iPhone's Photos App", Published on: Feb. 21, 2015 Available at: http://www.howtogeek.com/209923/5-things-you-need-to-know-about-your-iphone%E2%80%99s-photos-app/.

Hoffman, Chris, "Take Control of Your Smartphone's Automatic Photo Uploads", Published on: Feb. 5, 2015 Available at: http://www.howtogeek.com/208687/take-control-of-your-smartphone%E2%80%99s-automatic-photo-uploads/.

Martonik, Andrew, "Understanding and using Private Mode on the Samsung Galaxy S6", Published on: May 7, 2015 Available at: http://www.androidcentral.com/understanding-private-mode-samsung-galaxy-s6.

Windom, Percise, "Z Camera & Private Gallery (Review)", Published on: Jun. 24, 2015 Available at: http://www.androidguys.com/2015/06/24/z-camera-private-galleryreview/.

Chatterjee, Niladri, "How to Hide Any Folder or Files in Android Without Any Third Party App?", Published on: Dec. 2013 Available at: http://www.techabrel.com/2013/12/how-to-hide-any-folder-or-files-in-android-without-any-third-party-app.html.

Haider, Karar, "How to Hide Your Photos on Android", Published on: Jul. 1, 2015 Available at: http://www.ubergizmo.com/how-to/hide-photos-android/.

"Vaulty", Published on: Jan. 27, 2014 Available at: http://vaultyapp.com/.

Horowitz, Paul, "How to Hide Photos on iPhone & iPad with the iOS Hidden Album", Published on: Oct. 29, 2014 Available at: http://osxdaily.com/2014/10/29/how-hide-photos-iphone-ios/.

"Private Photo", Retrieved on: Sep. 1, 2015 Available at: https://itunes.apple.com/en/app/private-photo/id441044210?mt=8.

Ponder, George, "Keep Your Photos Private with These Windows Phone Apps", Published on: Apr. 19, 2013 Available at: http://www.windowscentral.com/keep-your-photos-private-these-windows-phone-apps.

* cited by examiner

CAPTURING AND VIEWING PRIVATE PHOTOS AND VIDEOS

BACKGROUND

Mobile computing devices, such as smartphones, typically include a camera with which a user may take photographs. The photographs may be saved to an image gallery on the mobile computing device and/or automatically saved to a remote storage location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for capturing and saving private images are provided. In one example, a camera includes an imaging sensor to translate light into a digital image, a storage device to save each of a plurality of the digital images in a digital format, and a privacy module to set a privacy setting of a newly-captured digital image. The privacy module is configured to set the privacy setting to indicate that the newly-captured digital image is a private digital image based at least on the privacy module being set to a privacy mode and to set the privacy setting to indicate that the newly-captured digital image is a non-private digital image based at least on the privacy module not being set to the privacy mode. The newly-captured digital image is saved in the digital format regardless if the newly-captured digital image is a private digital image or a non-private digital image. The camera further includes an image display interface to display, without authenticating private image credentials, only non-private digital images.

BRIEF DESCRIPTION OF TIE DRAWINGS

Figure 7:
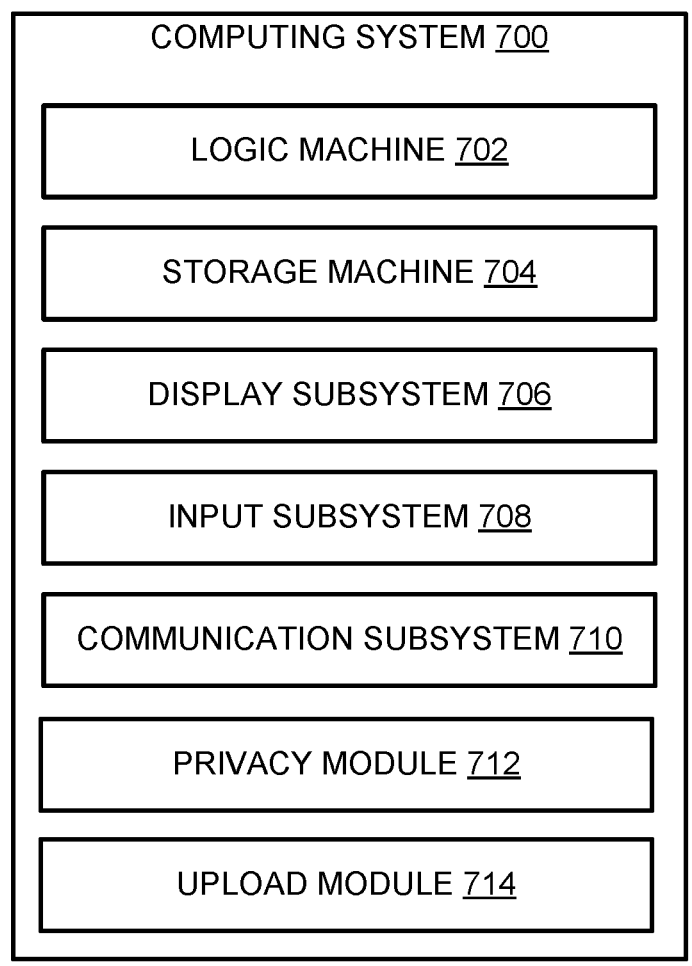

FIG. 7 schematically shows a non-limiting example of a computing system.

DETAILED DESCRIPTION

Smartphones, tablets, and personal computing devices may include cameras to capture digital images and/or may include photo libraries for storing and displaying digital images. These devices may automatically upload the images to a remote location for storage (such as the cloud), perform image recognition on the digital images to enable tagging of the images based on people, location, etc., and/or display the images in various locations, such as photo browsers, social media applications, etc. While these features may promote enhanced image organization and accessibility, these features may also make it challenging for users to maintain the privacy of certain images. For example, a user may spot a perfect gift for a spouse and desire to take a photo of the gift from his or her smartphone as a reminder for a subsequent holiday. However, if the photo of the gift is viewable via a photo browser on the user's smartphone, the user's spouse may accidentally view the photo of the gift. As such, the user may wish certain photos to be designated as being private, while still allowing some photos (such as photos of the user's children) to be widely viewable by others.

According to embodiments disclosed herein, a camera may be set to a privacy mode whereby any images captured while the camera is in the privacy mode are flagged as private. The private images may then be subject to a user-defined security protocol that may include the private images being selectively viewable, selectively sharable, selectively synched to other devices, or other security measures. For example, the private images may only be viewable via a private image display interface that is separate from the default, non-private image display interface. The private image display interface may require a user be authenticated before the private images may be viewed. Further, the private images may not be automatically uploaded to any remote devices, such as the cloud, or may not be accessible or viewable via photo sharing or third party applications. In doing so, the privacy of the photos may be maintained across an entire ecosystem of the device on which the photos are stored.

In some examples, the private photos may be stored in the same device memory location(s) as the non-private photos and may be saved in the same digital format as the non-private photos. For example, both the private photos and the non-private photos may be saved in the same unencrypted digital format (e.g., JPEG, TIFF, GIF, BMP, or PNG). Further, the private photos may be editable using the same editing functionalities as the non-private photos. In this way, the same photo editing features may be available to all photos, regardless of privacy, and the user is not forced to undergo additional steps to move the storage location of the private photos. Further still, the device on which the image is stored does not have to go through an extensive image encryption-decryption process, which may save storage space and allow the device to operate in a more efficient manner.

Figure 1:
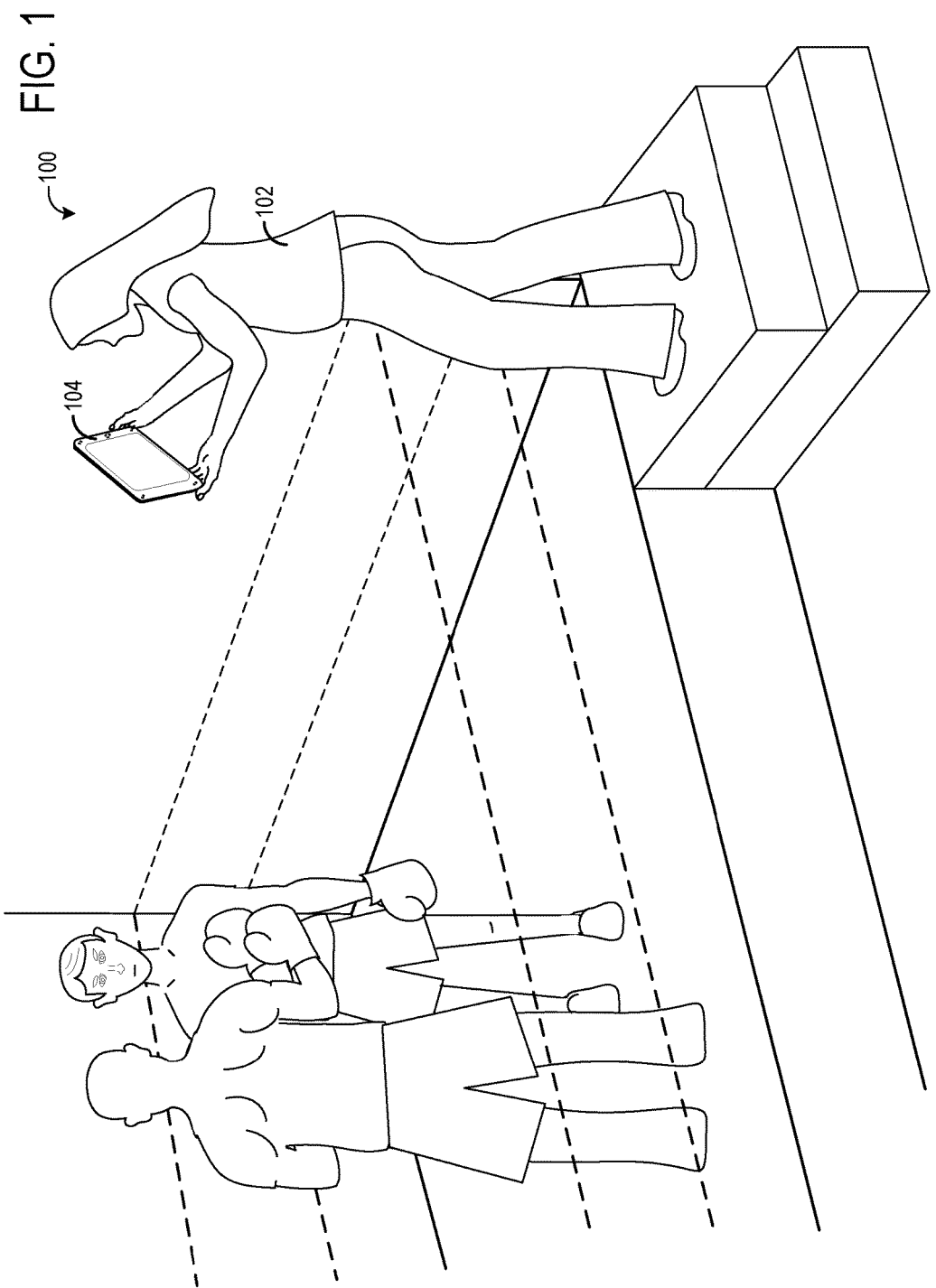
FIG. 1 shows an example camera use environment.

Turning to FIG. 1, an example environment 100 for capturing a private digital image is illustrated. As shown, a user 102 is capturing an image using a camera 104. Camera 104 may be any suitable camera, such as a smartphone, tablet, or standalone camera. Additional details of the camera will be described below with respect to FIG. 7. Camera 104 may include a privacy module configured to set privacy settings of captured images. The privacy settings may include indicating (via metadata associated with the images, for example) whether each image is private or non-private. When the camera and/or privacy module is set to the privacy mode, each image captured during the privacy mode may be flagged as private.

In the example illustrated in FIG. 1, camera 104 includes a user interface configured to allow a user 102 to set camera 104 to a privacy mode. User 102 may be attending a boxing match and may desire to capture images of the match. However, user 102 may have skipped a family obligation to attend the boxing match, and may thus choose to maintain the images captured during the boxing match private, to avoid any family members from viewing the images at a later time.

Other mechanisms for triggering the privacy mode may be implemented. For example, the privacy mode may be triggered based on a location of the camera (e.g., user 102 may indicate that images captured proximate certain cities or addresses are to be flagged as private, such as all images captured while in Las Vegas). Other triggers may include time of day, duration of time (e.g., from the time of day or from the privacy mode initially being triggered), users identified within the field of view of the camera and/or in proximity to the camera (e.g., within a threshold distance based on Bluetooth or other device-to-device monitoring), and other suitable triggers.

Once in the privacy mode, all images captured by the camera are flagged as private. In one example, each image captured while in privacy mode may be associated with metadata that indicates the image is private. In one example, the private/not-private metadata may be included as a flag in a digital wrapper that includes the image. In another example, a table may include a column for tracking private/not-private image status. In another example, the file name may indicate whether the image is private/not-private.

Figure 2:
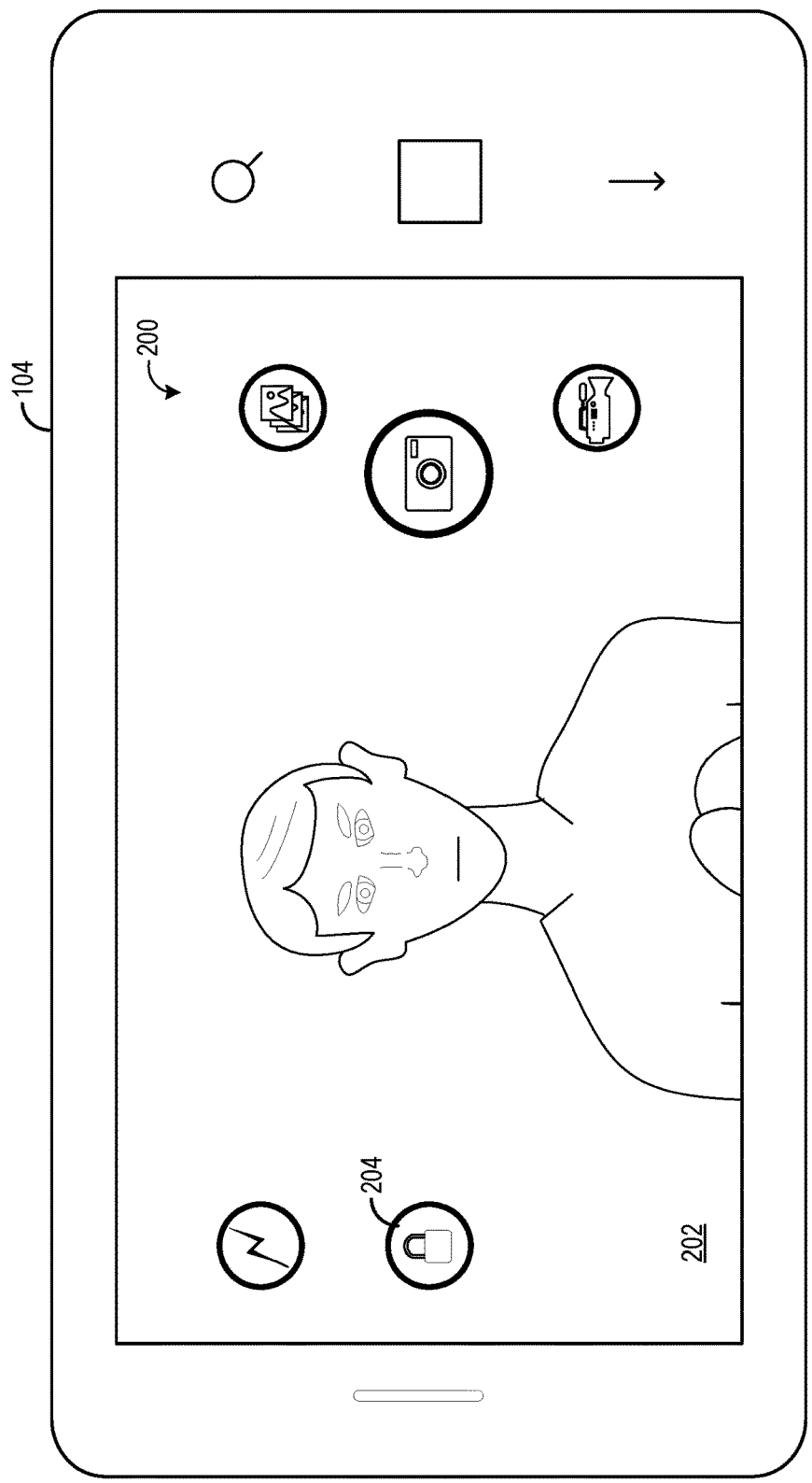
FIG. 2 shows an example camera interface.

FIG. 2 shows an example camera interface 200 that may be displayed on a display 202 of camera 104 while user 102 is capturing images. The camera interface 200 may include a plurality of user interface controls, displayed on display 202 as buttons or icons. The plurality of user interface controls includes a privacy control, displayed as privacy button 204. User 102 may touch or otherwise select privacy button 204 to activate or deactivate the privacy mode. When the camera is set to the privacy mode, privacy button 204 may include a locked lock (as shown), while when the camera is not set to the privacy mode, privacy button 204 may include an unlocked lock. However, other mechanisms for a user to activate the privacy mode may be implemented, and the indication that the camera is in the privacy mode may take other forms without departing from the scope of this disclosure.

As mentioned previously, newly-captured images (or post-capture images) that have been flagged as private images may have different security settings applied to the images than images that are not flagged as being private (e.g., non-private images). These security settings may be user-defined. For example, a camera that is regularly accessed by only a single user may be set with relatively low security settings, such that private images are still viewable in the regular image display interface, but may not be automatically synched or sent to other devices, such as a remote server. In another example, a camera that is regularly accessed by one user but occasionally accessed by another user (e.g., a spouse or a child) may be set with relatively high security settings, such that private images are not viewable in the regular image display interface without validating credentials, and are not automatically synched or sent to remote devices. Instead, the private images may be viewable in a private image display interface. The private image display interface may be accessible via the regular image display interface or may be accessed via a separate image display interface. Further, in some examples, private viewing credentials must be authenticated before allowing private images to be viewed.

Figure 3:
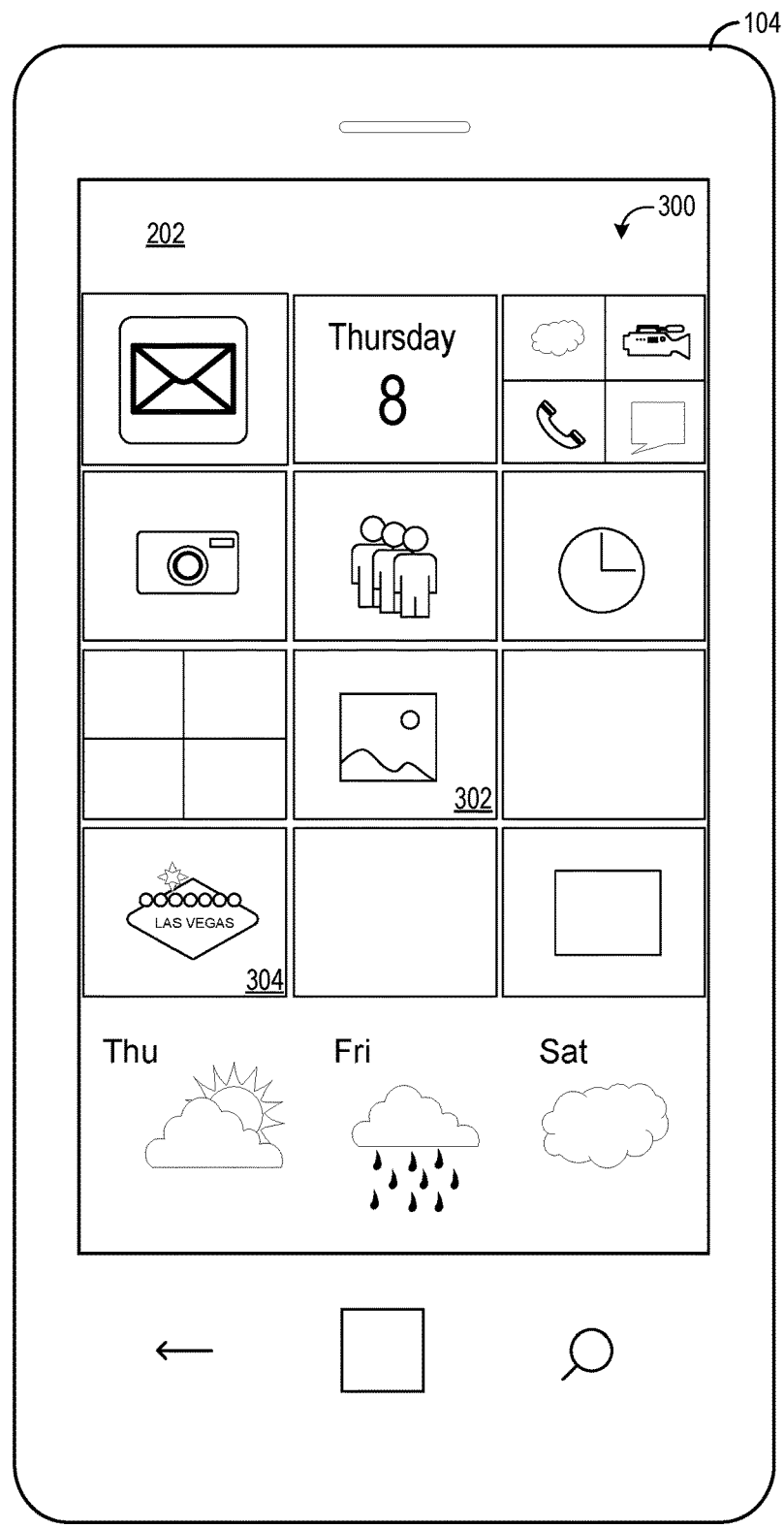
FIG. 3 shows an example home screen for a mobile computing device, including a link to an image display interface for non-private images and a private image display interface for private images.

FIG. 3 shows an example camera home screen interface 300 that may be displayed on display 202 of camera 104. Home screen interface 300 may include a plurality of user interface controls, herein illustrated as tiles, that may be selected by a user in order to view and/or interact with a variety of applications executable by camera 104. In particular, the illustrated home screen interface 300 includes an image display interface control tile 302 and a private image display interface control tile 304. When a user wishes to view non-private images, the user may select (e.g., via touch) image display interface control tile 302, and an image display interface may subsequently be displayed without credential authentication, where the non-private images are viewable. When a user wishes to view private images, the user may select (e.g., via touch) private image display interface control tile 304, and a private image display interface may subsequently be displayed after credential authentication, where the private images are viewable. In the illustrated example, image display interface control tile 302 may indicate relatively clearly that the tile points to the image display interface (e.g., by including thumbnails of images). On the other hand, the private image display interface control tile 304 may less clearly (or not at all) indicate that the tile points to the private image display interface (e.g., by not including image thumbnails). In this way, casual users of the camera 104 may not be aware that a separate, private image display interface is even available for viewing.

In some implementations, the camera may present no obvious mechanism for launching a private image display interface. For example, the private image display interface may be launched via an invisible user interface control button (e.g., a region of "empty" display space on a user interface that, when input is provided to the region, launches the private image display interface, or an existing control button that, when a secret input or series of inputs is provided to the button, launches the private image display interface. In other examples, the private image display interface may be launched in response to a secret sequence of user inputs, a secret voice command, a secret text input, or other suitable input.

Figure 4:
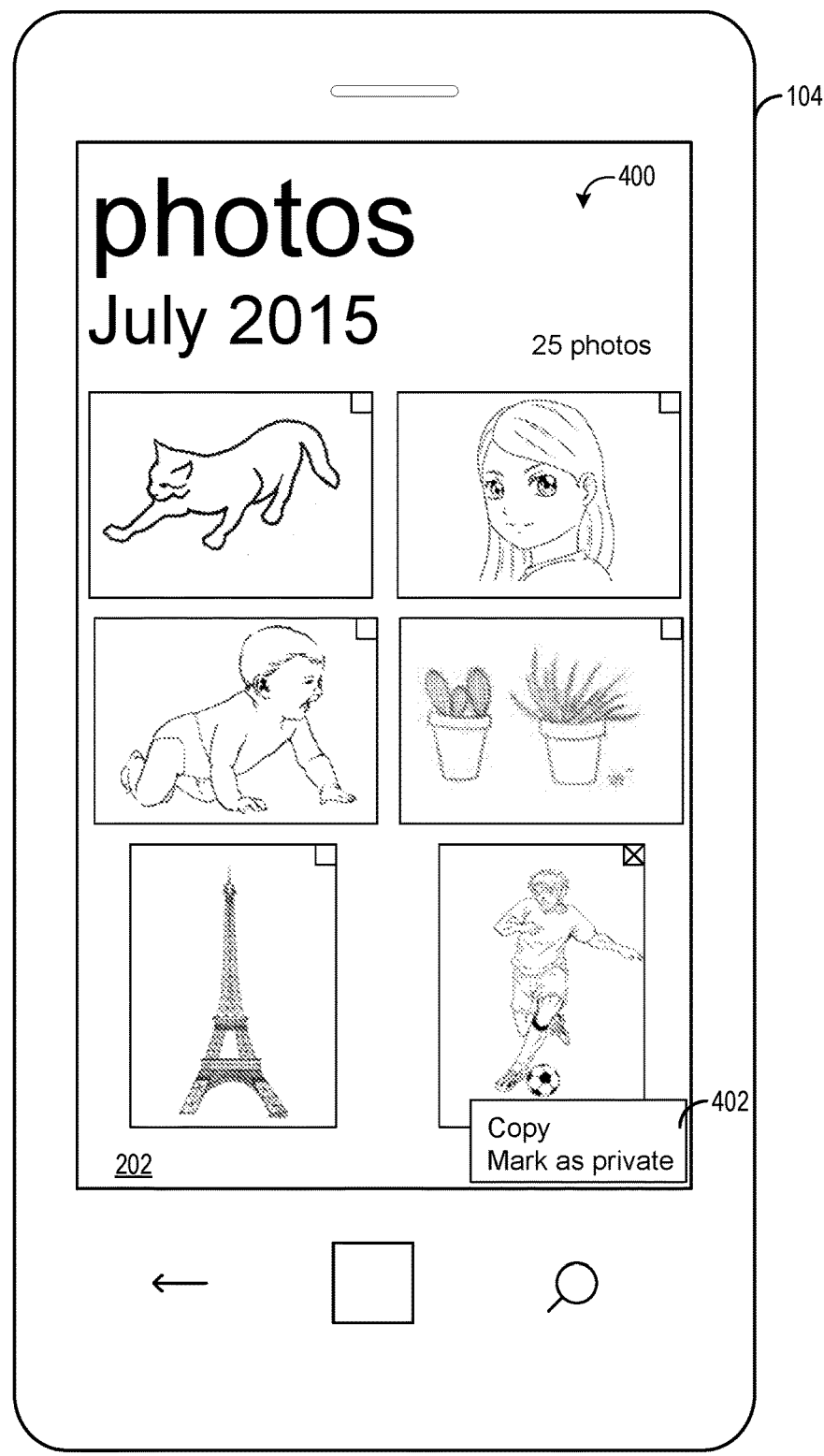
FIG. 4 shows an example image display interface for non-private images.

FIG. 4 shows an example image display interface 400 that may be displayed on display 202 of camera 104. As shown, the image display interface 400 is displaying an album of images (e.g., July 2015) that are not flagged as private (e.g., non-private images). The image display interface 400 includes a notation indicating the number of images in the album (25 images). Further, the images in the album are selectable by a user in order to execute various functions with the images. As shown, a user has selected the image in the lower right corner, and an interface control menu 402 is displayed. Among the selectable options displayed in the interface control menu 402 is an option to mark the image as private. In this way, a user may decide, at any point after capturing an image, that the image is to be flagged as private. Once an image is flagged as private, the metadata associated with the image is adjusted to indicate the image is a private image, and the associated security settings for private images are applied. For example, if the image illustrated in FIG. 4 is marked as private, the image may be no longer be viewable via image display interface 400 and/or a command may be issued to delete the image from any remotely located storage locations.

As mentioned previously, private images may be stored in the same memory as non-private images and may be stored in the same format as non-private images. Further, in some examples, the private images may be viewable in a private album accessible via the image display interface or may be viewable via a separate, private image display interface. Regardless of how the private images are accessed, the private images are not, without credential authentication, included as part of the number of images viewable in the image display interface, nor are the private images included in thumbnails displayed in the image display interface or other display locations (e.g., text message interface, email interface).

Figure 5:
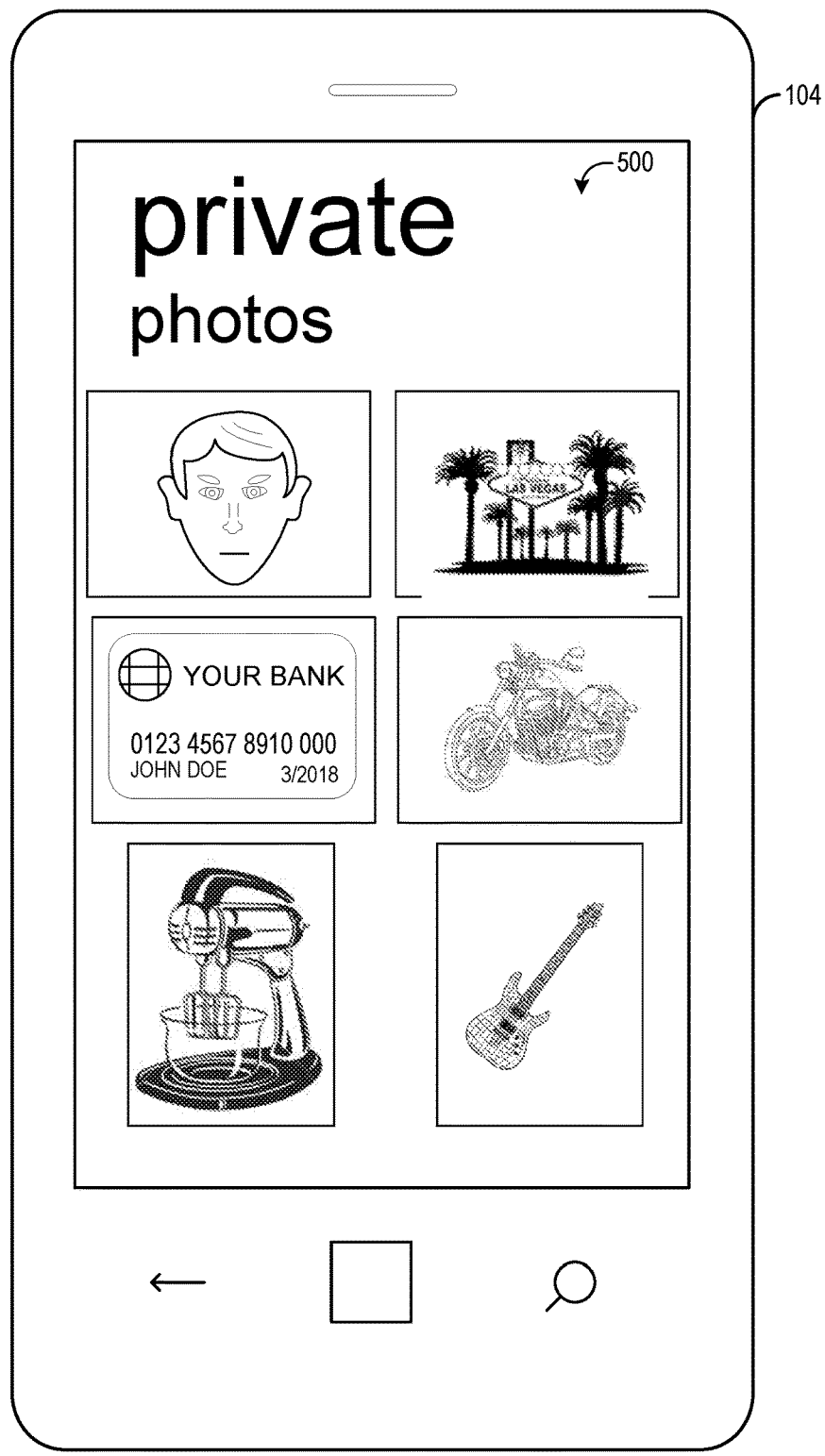
FIG. 5 shows an example private image display interface for private images.

FIG. 5 shows an example private image display interface 500 that may be displayed on display 202 of camera 104. As shown, the private image display interface 500 is displaying a plurality of images that are flagged as private (e.g., private images). As explained previously, the private image display interface 500 may only display private images after private image viewing credentials of a user have been authenticated (e.g., after a pin or password has been entered and verified). However, the private images themselves may be saved to memory (e.g., a storage device of the camera) in the same digital format as the non-private images. In this way, all the images captured by the camera may be encoded in the same manner, which may decrease the complexity of the privacy mode.

In the example shown, the private images are not organized into albums, although in some examples the private images may be organized in a manner similar to the non-private images. Additionally, the security settings applied to the private images may include not performing location or content recognition, and as such location or date information that may normally be associated with the images may be dispensed with, or at least not displayed.

Similar to the image display interface 400 described above, the images viewable in the private image display interface 500 are selectable by a user in order to execute various functions with the images, such as editing functions as well as the option to mark the image as non-private. In this way, a user may decide, at any point after capturing an image, that the image is to be flagged as non-private. Once an image is flagged as non-private, the metadata associated with the image is adjusted to indicate the image is a non-private image, and the associated security settings for non-private images are applied.

Figure 6:
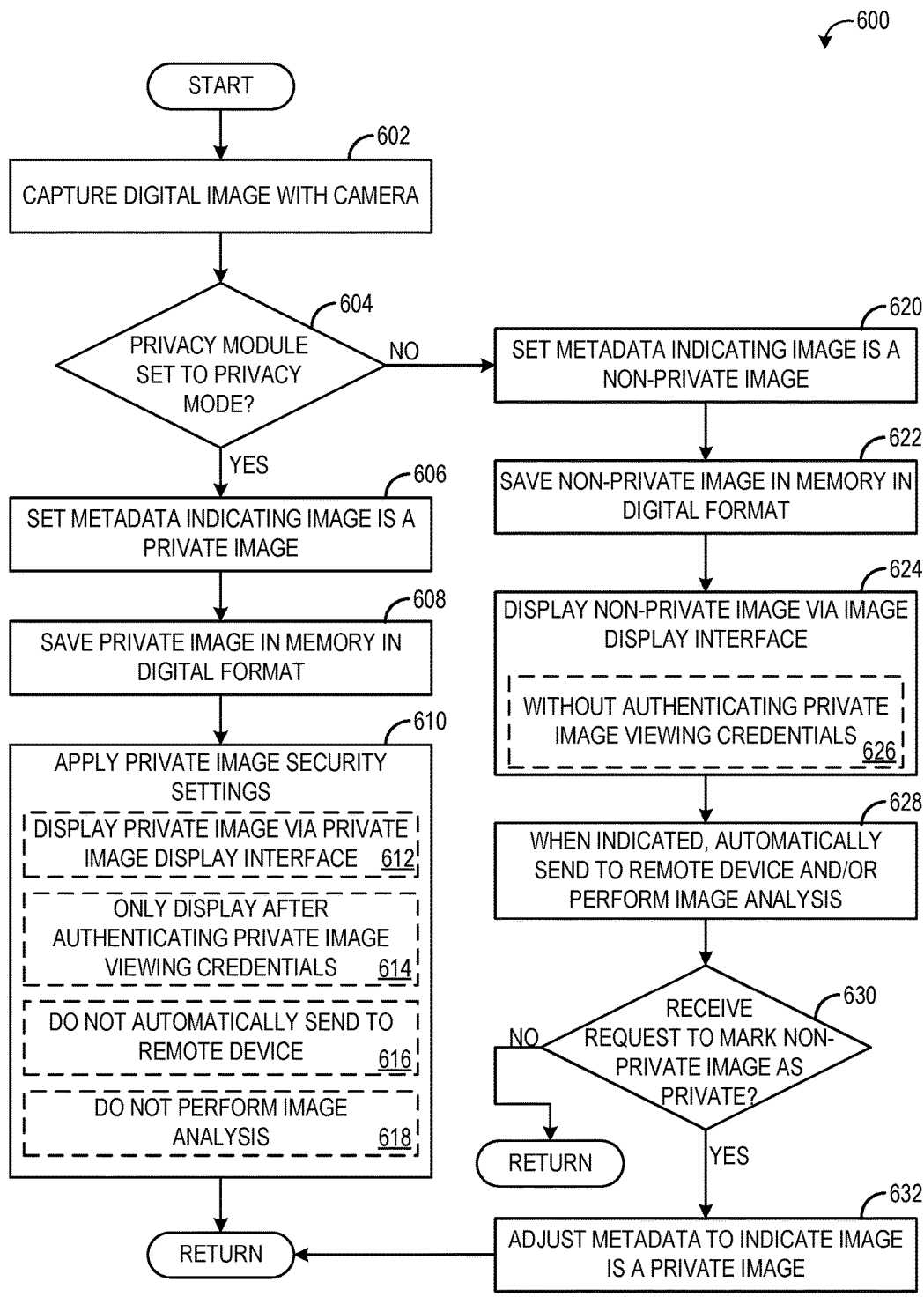
FIG. 6 is a flow chart illustrating a method for capturing and displaying private images.

FIG. 6 shows an example method 600 for capturing and displaying private and non-private digital images. Method 600 may be carried out by a logic machine of a computing device executing instructions held by a storage machine, such as camera 104 of FIGS. 1-5 and/or the computing device described below with respect to FIG. 7. In some implementations, the computing device may be part of the camera used to take the digital images. In some implementations, the computing device may be part of a user-computer used to manage a photo library. In some implementations, the computing device may be part of a server computer used to send/receive and/or store digital images.

At 602, method 600 includes capturing a digital image with a camera. In implementations where the computing device does not include the camera used to capture the image, the method may include receiving an image from a camera.

At 604, method 600 includes determining if the privacy module of the computing device is set to a privacy mode. The privacy mode may be set in response to a suitable action. In one example, a user may set the privacy module to the privacy mode via a user input (e.g., via input to a privacy button). In another example, the computing device may automatically trigger the privacy mode in response to a determined location of the camera capturing the image, in response to a determined time of day and/or of the week, and/or in response to a duration of time. Such locations and/or timings may be set in advance by a user, or may be learned by the computing device. Additionally, the location at which the image was captured may be determined from camera location information (e.g., GPS) and/or from location information within the captured image (e.g., image analysis may be performed to determine a location of the image).

In a still further example, the privacy mode may be triggered in response to other users within the captured image or in proximity to the camera while the image was captured. For example, after capture of the image, the computing device may perform image analysis and identify one or more users within the image. If at least one of the one or more users matches a designated user, the privacy module may be set to the privacy mode. Further, other users within proximity of the camera (e.g., within a threshold distance, as determined via location information obtained from the other users' own devices) may be determined and the privacy mode may be set if a designated user(s) is identified. Other mechanisms for triggering the privacy mode are within the scope of this disclosure.

If the privacy module is not set to the privacy mode, method 600 proceeds to 620, which will be described in more detail below. If the privacy module is set to the privacy mode, method 600 proceeds to 606 to set metadata associated with the image to indicate the image is a private image. At 608, the private image is saved in memory of the computing device in a digital format.

At 610, method 600 includes applying private image security settings to the private images. As mentioned previously, the private image security settings may be set by a user of the computing device according to the user's desired security protocol for private images. In one example, as indicated at 612, the security settings may include displaying the private image only via a private image display interface. The private image display interface may be a separate interface from the default image viewer for the computing device (e.g., separate from a photo library or camera roll). Further, as indicated at 614, the security settings may include only displaying the private images after private image viewing credentials have been authenticated. For example, before displaying the private images via the private image display interface, a user may be required to enter a password or pin or the device may be configured to use a biometric marker to authenticate a user (e.g., voice analysis, fingerprint scan, or retinal scan). Once the credentials are authenticated, the user may be presented with the private images.

In another example, the security settings may include preventing the private image from being automatically sent to a remote device, as indicated at 616. For example, a user of the computing device may desire to automatically upload all non-private images to a remote server (e.g., the cloud) in order to protect the non-private images from being lost. However, the user may not feel comfortable with the level of security afforded by the remote server, and hence may desire to prevent the private images from being automatically uploaded to the remote device. For example, the remote server may include a photo sharing site, wherein images uploaded to the remote server may be made accessible to other users via the photo sharing site. Preventing the automatic sending of the private image to the remote device may include not sending the private image to the remote device. In other examples, prior to sending the private image to the remote device, a notification may be displayed to the user asking the user to verify whether the private image is to be sent to the remote device.

As a still further example, the security settings may include preventing automatic image analysis from being performed on the private image, as indicated at 618. Such image analysis may include identification of users or objects within the private image as well as identification of the location and/or date and time at which the private was captured. In some examples, no image analysis may be performed on the private image. In other examples, a notification may be displayed to the user asking the user to verify whether the image analysis is to be performed on the private image.

Returning to 604, if it was determined that the privacy module is not set to the privacy mode, method 600 proceeds to 620 to set metadata associated with the image to indicate the image is a non-private image. In some examples, the metadata may include a default setting indicating the image is non-private (e.g., lack of an indication that the image is a private image may be sufficient to indicate the image is non-private). At 622, the non-private image is saved in memory of the computing device in a digital format. In some examples, the non-private image may be saved to a same memory location of the private image (e.g., photo library storage), and may be saved in the same digital format (e.g., unencrypted JPEG).

At 624, method 600 includes displaying the non-private image via an image display interface. The image display interface may be a default or standard image viewing interface, such as the computing device photo library or camera roll. When a user wishes to view the non-private images, the non-private images may be viewed via the image display interface without any private image viewing credentials being authenticated, as indicated at 626. Further, at 628, the non-private image may be automatically sent to a remote device, at least when indicated (e.g., the non-private image may be automatically uploaded to the cloud at a predetermined time of the day/week).

At 630, method 600 includes determining if a request to mark the non-private image as private has been received. As explained previously, a user may designate a non-private image as private at any point after capture and/or storage of the non-private image. If a request has been received, method 600 proceeds to 632 to adjust the metadata of the non-private image to indicate the image is a private image. Upon indicating the image is a private image, the private image security settings may be applied, as described at 610. In other examples, selected non-private images may be designated as private images based at least on a privacy parameter of the selected non-private images being met, where the privacy parameter may include a location that the image was captured, identified user(s) within the image or proximate the image at the time of capture, and so forth. For example, a user may capture a plurality of digital images while on vacation at a given location and then decide at a later time that all images captured during the vacation be made private. The use may indicate to the privacy module to mark all images captured proximate the given location as private images, and then the privacy module may automatically adjust the metadata to indicate those images are private images.

Thus, the devices and methods described herein may enable users to capture and review private content securely in image and camera applications, and in a manner that is upheld across device ecosystems and remote services. While the privacy mode was described herein in respect to images, it is to be understood that a similar privacy mode could be applied to other types of content, such as text documents. Additionally, while the privacy mode was described herein as being applied on a single, local device, in some configurations the privacy mode may be applied across multiple devices in a collaborative manner. For example, multiple users traveling on a vacation together may each set their respective devices to a privacy mode and all images captured while in the privacy mode may be stored as private images in a single album that is accessible to all the users (e.g., on a remote device).

In some embodiments, the methods and processes described herein may be tied to a computing system of one or more computing devices. In particular, such methods and processes may be implemented as a computer-application program or service, an application-programming interface (API), a library, and/or other computer-program product.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive. MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Computing system 700 may include a privacy module 712. As explained above, privacy module 712 may be configured to set privacy settings of newly-captured images and post-capture images or other types of content. The privacy settings set by privacy module 712 may include an indication in metadata associated with an image of whether or not the image is a private image. The privacy module 712 may be set to a privacy mode in order to indicate the image is private. Computing system 700 may further include an upload module 714. Upload module 714 may automatically or semi-automatically upload content saved in storage machine 704 to a remote device, such as a remote server. Upload module 714 may be configured to only upload non-private images and not upload private images.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Additionally, the infrared, color, stereoscopic, and/or depth camera may include imaging sensor(s) to translate light into digital images. The digital images may be marked as private or non-private, as explained above.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides for a camera including an imaging sensor to translate light into a digital image; a storage device to save each of a plurality of the digital images in a digital format; a privacy module to set a privacy setting of a newly-captured digital image, the privacy module configured to set the privacy setting to indicate that the newly-captured digital image is a private digital image based at least on the privacy module being set to a privacy mode and to set the privacy setting to indicate that the newly-captured digital image is a non-private digital image based at least on the privacy module not being set to the privacy mode, wherein the newly-captured digital image is saved in the digital format regardless if the newly-captured digital image is a private digital image or a non-private digital image; and an image display interface to display, without authenticating private image credentials, only non-private digital images. In such an example, the camera may additionally or alternatively include a camera user interface configured to allow a user to set the privacy module to the privacy mode. In such an example, the camera may additionally or alternatively be configured to set the privacy module to the privacy mode based at least on a location at which the newly-captured digital image was captured. In such an example, the camera may additionally or alternatively be configured to set the privacy module to the privacy mode based at least on a time of day at which the newly-captured digital image was captured. In such an example, the camera may additionally or alternatively be configured to set the privacy module to the privacy mode based at least on one or both of identified users being in proximity of the camera and recognized image content of the newly-captured digital image. In such an example, the camera may additionally or alternatively include a private image display interface configured to display private digital images. In such an example, the private image display interface may additionally or alternatively be configured to display the private digital images only after authenticating the private image credentials. In such an example, the camera may additionally or alternatively include an automatic upload module configured to automatically upload non-private digital images to a remote device without uploading private digital images to the remote device. In such an example, the privacy module may additionally or alternatively be configured to set a privacy setting of one or more digital images saved in the storage device, including adjusting a privacy setting of a selected non-private digital image to private based at least on a privacy parameter of the selected non-private digital image being met. In such an example, the privacy module may additionally or alternatively be configured to set the privacy setting for the newly-captured digital image to indicate the newly-captured digital image is a private image by indicating in metadata associated with the newly-captured digital image that the newly-captured digital image is a private digital image. Any or all of the above-described examples may be combined in any suitable manner in various implementations.

Another example provides for a computing system including a privacy module to set a privacy setting of a digital image, the privacy module configured to set the privacy setting to indicate that the digital image is a private digital image based at least on the privacy module being set to a privacy mode and to set the privacy setting to indicate that the digital image is a non-private digital image based at least on the privacy module not being set to the privacy mode; and a storage device to save the digital image in a digital format, the digital image saved in the digital format regardless if the digital image is a private digital image or a non-private digital image. In such an example, the computing system may additionally or alternatively include an image display interface to display, without authenticating private image credentials, only non-private digital images. In such an example, the computing system may additionally or alternatively include a private image display interface configured to display private digital images only after authenticating the private image credentials. In such an example, the computing system may additionally or alternatively include an automatic upload module configured to automatically upload non-private digital images to a remote device without uploading private digital images to the remote device. In such example, the privacy module may be additionally or alternatively configured to set the privacy setting for the digital image to indicate the digital image is a private image by indicating in metadata associated with the digital image that the digital image is a private digital image. Any or all of the above-described examples may be combined in any suitable manner in various implementations.

Another example provides for a method for a computing device including a camera. The method includes capturing a first image with the camera; saving the first image in memory of the computing device; displaying the first image via an image display interface; prior to the camera capturing a second image, receiving an indication that the second image is a private image based at least on a location of the computing device; after capture of the second image, saving the second image in the memory of the computing device; and displaying the second image via a private image display interface, the second image displayed only after private image credentials have been authenticated. In such an example, the first image and the second image may additionally or alternatively be saved in the memory of the computing device in the same unencrypted digital format. In such an example, displaying the first image via the image display interface may additionally or alternatively include displaying the first image via the image display interface without authenticating the private image credentials. In such an example, the method may additionally or alternatively include, after saving the first image in the memory of the computing device and displaying the first image via the image display interface, receiving a request to mark the first image as a private image, and based at least on the request, stopping display of the first image via the image display interface and instead displaying the first image via the private image display interface only after the private image credentials have been authenticated. In such an example, the method may additionally or alternatively include automatically uploading the first image to a remote device without uploading the second image to the remote device. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a computing device including a camera, comprising:
    capturing a first image with the camera;
    saving the first image in memory of the computing device;
    displaying the first image via an image display interface;
        prior to the camera capturing a second image, receiving an indication that the second image is a private image based at least on a location of the computing device;
        after capture of the second image, saving the second image in the memory of the computing device; and
        displaying the second image via a private image display interface, the second image displayed only after private image credentials have been authenticated.

2. The method of claim 1, wherein the first image and the second image are saved in the memory of the computing device in the same unencrypted digital format.

3. The method of claim 1, wherein displaying the first image via the image display interface comprises displaying the first image via the image display interface without authenticating the private image credentials.

4. The method of claim 1, further comprising, after saving the first image in the memory of the computing device and displaying the first image via the image display interface, receiving a request to mark the first image as a private image, and based at least on the request, stopping display of the first image via the image display interface and instead displaying the first image via the private image display interface only after the private image credentials have been authenticated.

5. The method of claim 1, further comprising automatically uploading the first image to a remote device without uploading the second image to the remote device.

6. A camera, comprising:
    an imaging sensor configured to capture digital images;
    a storage device configured to save the captured digital images;
    a privacy module configured to set a privacy setting for captured digital images, wherein:
        the privacy module sets the privacy setting for a first digital image to indicate that the first digital image is a non-private image; and prior to capture of a second digital image, the privacy module sets the privacy setting for the second digital image to indicate that the second digital image is a private image based at least on a location of the camera;

an image display interface configured to display the first digital image; and a private image display interface configured to display the second digital image only after private image credentials have been authenticated.

7. The camera of claim 6, wherein the image display interface is configured to display the first digital image without authenticating the private image credentials.

8. The camera of claim 6, wherein the first digital image and the second digital image are saved by the storage device in the same unencrypted digital format.

9. The camera of claim 6, wherein the privacy module is configured to set the privacy setting for the second digital image to indicate that the second digital image is a private image by indicating in metadata associated with the second digital image that the second digital image is a private digital image.

10. The camera of claim 6, further comprising a camera user interface configured to allow a user to set the privacy setting for captured digital images.

11. The camera of claim 6, wherein the privacy module sets the privacy setting for a third digital image to indicate that the third digital image is a private image based at least on a time of day at which the third digital image was captured.

12. The camera of claim 6, wherein the privacy module sets the privacy setting for a third digital image to indicate that the third digital image is a private image based at least on identified users being in proximity of the camera.

13. The camera of claim 6, wherein the privacy module sets the privacy setting for a third digital image to indicate that the third digital image is a private image based at least on recognized image content of the third digital image.

14. The camera of claim 6, further comprising an automatic upload module configured to automatically upload non-private digital images to a remote device without uploading private digital images to the remote device.

15. The camera of claim 6, wherein the privacy module is further configured to set the privacy setting for one or more digital images saved by the storage device, including adjusting the privacy setting for a selected non-private digital image to private based at least on a privacy parameter of the selected non-private digital image being met.

16. A computing system, comprising:

a camera configured to capture digital images;

a storage device configured to save the captured digital images;

a privacy module configured to set a privacy setting for captured digital images, wherein:

the privacy module sets the privacy setting for a first digital image to indicate that the first digital image is a non-private image; and prior to capture of a second digital image, the privacy module sets the privacy setting for the second digital image to indicate that the second digital image is a private image based at least on a location of the camera;

an image display interface configured to display the first digital image;

a private image display interface configured to display the second digital image only after private image credentials have been authenticated; and an automatic upload module configured to automatically upload the first digital image to a remote device without automatically uploading the second digital image to the remote device.

17. The computing system of claim 16, wherein the image display interface is configured to display the first digital image without authenticating the private image credentials.

18. The computing system of claim 16, further comprising a camera user interface configured to allow a user to set the privacy setting for captured digital images.

19. The computing system of claim 16, wherein the first digital image and the second digital image are saved by the storage device in the same unencrypted digital format.

20. The computing system of claim 16, wherein the privacy module is configured to set the privacy setting for the second digital image to indicate that the second digital image is a private image by indicating in metadata associated with the second digital image that the second digital image is a private digital image.

* * * * *